US010617123B2

(12) United States Patent
López-Cervantes

(10) Patent No.: US 10,617,123 B2
(45) Date of Patent: *Apr. 14, 2020

(54) AGRICULTURAL USES OF HYTD

(71) Applicant: Agrinos AS, Lysaker (NO)

(72) Inventor: Jaime López-Cervantes, Obregon (MX)

(73) Assignee: Agrinos AS, Oslo (NO)

( * ) Notice: Subject to any disclaimer, the term of this patent is extended or adjusted under 35 U.S.C. 154(b) by 113 days.

This patent is subject to a terminal disclaimer.

(21) Appl. No.: 15/488,317

(22) Filed: Apr. 14, 2017

(65) Prior Publication Data

US 2017/0215431 A1 Aug. 3, 2017

Related U.S. Application Data

(60) Division of application No. 14/585,715, filed on Dec. 30, 2014, now abandoned, which is a continuation of application No. 13/530,536, filed on Jun. 22, 2012, now abandoned.

(60) Provisional application No. 61/500,543, filed on Jun. 23, 2011.

(51) Int. Cl.
| | |
|---|---|
| *A01N 63/10* | (2020.01) |
| *A01N 43/16* | (2006.01) |
| *A01N 63/00* | (2020.01) |
| *A01N 63/30* | (2020.01) |
| *C05G 3/00* | (2020.01) |
| *C05D 3/00* | (2006.01) |
| *C05F 11/08* | (2006.01) |
| *C05G 3/02* | (2006.01) |

(52) U.S. Cl.
CPC ............ *A01N 63/10* (2020.01); *A01N 43/16* (2013.01); *A01N 63/00* (2013.01); *A01N 63/30* (2020.01); *C05D 3/00* (2013.01); *C05F 11/08* (2013.01); *C05G 3/00* (2013.01); *C05G 3/02* (2013.01)

(58) Field of Classification Search
CPC ......... A01N 63/00; A01N 63/02; A01N 43/16
See application file for complete search history.

(56) References Cited

U.S. PATENT DOCUMENTS

| | | | |
|---|---|---|---|
| 3,987,802 A | | 10/1976 | Austin |
| 4,199,496 A | * | 4/1980 | Peniston ............ A23J 1/10 |
| | | | 530/369 |
| 4,536,207 A | | 8/1985 | McCandliss |
| 4,812,159 A | * | 3/1989 | Freepons ............ A01N 43/16 |
| | | | 47/57.6 |
| 4,952,229 A | | 8/1990 | Muir |
| 4,964,894 A | | 10/1990 | Freepons |
| 4,978,381 A | | 12/1990 | Hadwiger |
| 5,266,096 A | | 11/1993 | Slavensky |
| 5,374,627 A | | 12/1994 | Kazuhiro |
| 5,733,851 A | | 3/1998 | Villanueva |
| 5,908,634 A | | 6/1999 | Kemp et al. |
| 5,998,173 A | | 12/1999 | Haynes et al. |
| 6,060,429 A | | 5/2000 | Ben-Shalom |
| 6,232,270 B1 | | 5/2001 | Branly |
| 6,407,040 B1 | | 6/2002 | Nichols |
| 6,524,998 B1 | | 2/2003 | Kloepper |
| 6,649,566 B2 | | 11/2003 | Doostar |
| 6,979,664 B1 | | 12/2005 | Smith et al. |
| 7,241,463 B2 | | 7/2007 | Nielsen |
| 7,250,068 B1 | | 7/2007 | Smith et al. |
| 8,748,124 B2 | | 6/2014 | Lopez-Cervantes et al. |
| 9,253,989 B2 | | 2/2016 | Smith et al. |
| 2007/0112183 A1 | | 5/2007 | Kitano et al. |
| 2009/0120147 A1 | | 5/2009 | Blais |
| 2010/0267999 A1 | | 10/2010 | Lau et al. |
| 2012/0084886 A1 | | 4/2012 | López-Cervantes |
| 2012/0329135 A1 | | 12/2012 | Lopez-Cervantes et al. |
| 2013/0255338 A1 | | 10/2013 | Lopez-Cervantes et al. |

(Continued)

FOREIGN PATENT DOCUMENTS

| | | |
|---|---|---|
| CN | 1289743 A | 4/2001 |
| EP | 1142988 A1 | 10/2001 |

(Continued)

OTHER PUBLICATIONS

Robert Edward Costa Jr. "The Fertilizer Value of Shrimp and Crab Processing Wastes", (1977), Oregon State University: 1-167 (Year: 1977).*
Saber et al., "Identification of newly detected *Puccinia pimpinellae* on anise plant in Egypt and its control using biotic and abiotic elicitors in relation to growth and yield," *African Journal of Microbiology Research*, vol. 3, No. 4, pp. 153-162, 2009.
Aye and Stevens, "Technical Note: Improved chitin production by pretreatment of shrimp shell," *Journal of Chemical Technology and Biotechnology*, vol. 79, pp. 421-425, 2004.

(Continued)

*Primary Examiner* — Teresa E Knight
(74) *Attorney, Agent, or Firm* — Klarquist Sparkman, LLP

(57) ABSTRACT

Disclosed are compositions comprising chitosan, glucosamine and amino acids, where the concentration of chitosan is greater than 1.5 wt % and glucosamine is greater than 1.5 wt %. In preferred embodiments the concentration of chitosan is from 2 to 2.5 wt % and glucosamine is 2 to 6 wt %. The composition can also include solid chitin. The composition can also include trace elements, protein and other polysaccharides. The composition is generally a liquid but may be a solid. In most embodiments, the solid can be reconstituted with water prior to use. In preferred embodiments, the composition comprises HYTd and at least one of, HYTa, HYTb and HYTc. In other embodiments the composition comprises HYTd and two or more of, HYTa, HYTb and HYTc. The composition can also comprise HYTd, HYTa, HYTb and HYTc. In the disclosed processes soil, seed, seedling or plant foliage are contacted with HYTd or any of the above compositions.

5 Claims, 8 Drawing Sheets

(56) References Cited

U.S. PATENT DOCUMENTS

2014/0179521 A1 6/2014 Fuller
2015/0257393 A1 9/2015 Nijak et al.

FOREIGN PATENT DOCUMENTS

| JP | 2003160420 | 6/2003 |
|---|---|---|
| KR | 20050117990 | 12/2005 |
| WO | WO 89/01288 | 2/1989 |
| WO | WO 97/09879 A1 | 3/1997 |
| WO | WO 2011/157747 | 12/2011 |
| WO | WO 2012/175739 | 12/2012 |

OTHER PUBLICATIONS

Bhaskar et al., "Shrimp biowaste fermentation with *Pediococcus acidolactici* CFR2182: Optimization of fermentation conditions v by response surface methodology and effect of optimized conditions on deproteination/demineralization and carotenoid recovery," *Enzyme and Microbial Technology*, vol. 40, pp. 1427-1434, 2007.

Bhattacharya et al., "Bacterial Chitinases: Properties and Potential," *Critical Reviews in Biotechnology*, vol. 27, pp. 21-28, 2007.

Campbell et al., "A study of Chitin-decomposing Micro-organisms of Marine Origin," *Journal of General Microbiology*, vol. 5, pp. 894-905, 1951.

Cho et al. "Environment-Friendly Farming Material Comprising Chitosan which Allows to Facilitate Growth of Plants, Prevent Growth of Plant Pathogenic Bacteria, Reduce Consumed Amount of Agricultural Chemicals, and Increase Crop Yield of Plants," C&C Science Co., Ltd., S. Korea, Database Accession No. 145:350160.

Cira et al., "Pilot scale lactic acid fermentation of shrimp wastes for chitin recovery," *Process Biochemistry*, vol. 37, pp. 1359-1366, 2002.

Cody, "Distribution of Chitinase and Chitobiase in Bacillus," *Current Microbiology*, vol. 19, pp. 201-205, 1989.

Kanemitsuy, "Recovery from Pine Wilt Using Low-Molecular-Weight Chitosan Solution," Kansai Kitosan Y.K., Japan, Database Accession No. 139:2389.

López-Cervantes et al., "Analysis of free amino acids in fermented shrimp C1 waste by high-performance liquid chromatography," *Journal of Chromatography*, vol. 1105, Nos. 1-2, pp. 106-110, 2006.

Nandakumar et al., "Chitinolytic Activity of Native *Pseudomonas fluorescens* Strains," *Journal of Agriculture Science and Technology*, vol. 9, pp. 61-68, 2007.

Sini et al., "Study on the production of chitin and chitosan from shrimp shell by using *Bacillus subtilis* fermentation," *Carbohydrate Research*, vol. 342, pp. 2423-2429, 2007.

Tagrow, AminoUp Amino Acid Powder (Vegetable Base), http://web.archive.org/web/20100823044352/http://www.tagrow.com/products/amino-up.htm, Aug. 23, 2010 (retrieved on Aug. 16, 2014), 1 page.

Declaration of Dr. Jaime Lopez-Cervantes, executed on Oct. 18, 2011, submitted in International App. No. PCT/EP2010/070285 on Oct. 28, 2011 (2 pages).

* cited by examiner

AGRICULTURAL USES OF HYTD

This is a division of application Ser. No. 14/585,715, filed Dec. 30, 2014, which is a continuation of application Ser. No. 13/530,536, filed Jun. 22, 2012, which claims the benefit of U.S. Provisional Application No. 61/500,543 filed Jun. 23, 2011, each of which is incorporated herein by reference in its entirety.

TECHNICAL FIELD

Processes and compositions are disclosed that enhance crop production, increase plant defensive processes, decrease the level of plant pathogens and reduce the amount of fertilizer used.

BACKGROUND OF THE INVENTION

Microbes have previously been used in agriculture. Examples include those disclosed in U.S. Pat. Nos. 4,952,229; 6,232,270 and 5,266,096.

Chitin has also been used in agriculture either as a protein complex (U.S. Pat. No. 4,536,207) or in combination with various microbes (U.S. Pat. Nos. 6,524,998 and 6,060,429)

Chitosan in combination with other components has been used in agricultural applications. See e.g. U.S. Pat. Nos. 6,649,566; 4,812,159; 6,407,040; 5,374,627 and 5,733,851. It has also been used to treat cereal crop seeds. See U.S. Pat. No. 4,978,381. U.S. Pat. No. 6,524,998 also discloses that chitosan can be used in combination with specific microbes for agricultural use.

HYTb alone or in combination with HYTc and the microbial composition HYTa are useful in the treatment of soil, seed, seedlings and foliage as disclosed in U.S. patent application Ser. No. 61/355,447 filed Jun. 16, 2010 entitled Microbial Process and Composition for Agricultural Use and U.S. patent application Ser. No. 13/160,333 filed Jun. 14, 2011 entitled Microbial Process and Composition, each of which is incorporated herein by reference in its entirety.

Notwithstanding the foregoing, there is a need to provide improved compositions and processes that improve crop yield and reduce the amount of conventional fungicides and insecticides used in agricultural and horticultural applications.

SUMMARY OF THE INVENTION

Compositions are disclosed comprising chitosan, glucosamine and amino acids, where the concentration of chitosan is greater than 1.5 wt % and glucosamine is greater than 1.5 wt %. In preferred embodiments the concentration of chitosan is from 2 to 2.5 wt % and glucosamine is 2 to 6 wt %. The composition can also include solid chitin, but generally no more than about 2 wt %

The composition can also include trace elements, protein and other polysaccharides.

The composition is generally a liquid but may be a solid. In most embodiments, the solid can be reconstituted with water prior to use.

In preferred embodiments, the composition comprises HYTd and at least one of, HYTa, HYTb and HYTc. In still other embodiments the composition comprises HYTd and two or more of, HYTa, HYTb and HYTc. The composition can also comprise HYTd, HYTa, HYTb and HYTc.

In the disclosed processes soil, seed, seedling or plant foliage are contacted with HYTd or any of the above compositions.

Also disclosed is treated soil composition which comprises soil treated with HYTd or any of the above compositions.

Also disclosed is treated plant which comprises plant treated with HYTd or the composition of any of the above compositions.

Also disclosed is treated seed or seedling comprising seed or seedling treated with HYTd or any of the above compositions.

DETAILED DESCRIPTION

Figure 1:
FIG. 1 shows the results of treating asparagus with HYTa+HYTb.

Disclosed are compositions comprising chitosan, glucosamine and amino acids, where the concentration of said chitosan is greater than 1.5 wt % said glucosamine is greater than 1.5 wt %. In preferred embodiments the concentration of chitosan is from 2 to 2.5 wt % and glucosamine is 2 to 6 wt %. The composition can also include solid chitin, but generally no more than about 2 wt %. The composition can also include trace elements, protein and other polysaccharides. The composition is generally a liquid but may be a solid. In most embodiments, the solid can be reconstituted with water prior to use. In preferred embodiments, the composition comprises HYTd. In other embodiments the composition comprises HYTd and at least one of, HYTa, HYTb and HYTc. In still other embodiments the composition comprises HYTd and two or more of, HYTa, HYTb and HYTc. The composition can also comprise HYTd, HYTa, HYTb and HYTc. In the disclosed processes soil, seed, seedling or plant foliage are contacted with HYTd or any of the above compositions.

HYTa

As used herein, the term "HYTa" refers to a consortium of microbes derived from fertile soil samples and commercial sources. HYTa was deposited with the American Tissue Type Culture (ATTC), Rockville, Md., on May 19, 2010 with an assigned deposit designation of PTA-10973.

Table 1 identifies some of the microbes in HYTa that are believed to be responsible for the beneficial effects observed when it is used to treat soil and/or foliage.

TABLE 1

Bacteria

I. *Azotobacter*
   1. *Azotobacter vinelandii*
II. *Clostridium*
   1. *Clostridium pasteurianum*
   2. *Clostridium beijerinckii*
   3. *Clostridium sphenoides*
   4. *Clostridium bifermentans*
III. *Lactobacillus*
   1. *Lactobacillus paracasei* ss. *paracasei*
   2. *Lactobacillus acidophillus*
   3. *Lactobacillus delbrueckii* ss. *Bulgaricus*
   4. *Lactobacillus brevis*
IV. *Bacillus*
   1. *Bacillus amyloliquefaciens* (*Bacillus subtilis* ((SILoSil ® BS))
   2. *Bacillus thuringiensis* var. *kurstakii* (*Bacillus thuringiensis* (Strains HD-1))
   3. *Bacillus thuringiensis* var. *canadensis* (*Bacillus cereus* group)
   4. *Bacillus pasteurii* (*Bacillus cereus* group)
   5. *Bacillus sphaericus* (subgroup I, III, and IV)
   6. *Bacillus megaterium* (subgroup A)
V. *Acetobacter* or *Gluconacetobacter*
   1. *Acetobacter aceti* ss. *liquefaciens*
   2. *Acetobacter aceti* ss. *xylimum*
VI. *Enterococcus*
   1. *Enterococcus faecium* (subgroup A)
VII. *Pediococcus*
   1. *Pediococcus pentosaceus*
VII. *Rhizobium*
   1. *Rhizobium japonicum*

Fungi

I. *Saccharomyces*
   1. *Saccharomyces cerevisiae*
II. *Penicillium*
   1. *Penicillium roqueforti*
III. *Monascus*
   1. *Monascus ruber*
IV. *Aspergillus*
   1. *Aspergillus oryzae*
V. *Trichoderma*
   1. *Trichoderma harzianum* (TRICHOSIL)

Plantae

I. *Arthrospira*
   1. *Arthrospira platensis*
II. *Ascophyllum*
   1. *Ascophyllum nodosum*

Other microorganisms contained in HYTa: *Nitrobacter, Nitrosomonads, Nitrococcus, Pseudomonas, Micrococcus luteus, Actinomycetes, Azotobacter vinelandii, Lactobacillus casei, Trichoderma harzianum, Bacillus licheniformis, Pseudomonas fluorescens* and *Streptomyces*.

Active microbes in HYTa include nitrogen-fixing microorganisms native to soil. These are *Azotobacter vinelandii* and *Clostridium pasteurianum*. *Bacillus subtilis* provides enzymes for breaking down plant residue. *Bacillus cereus* provides additional enzymes to break down plant residue and penicillinase to decease unwanted bacteria. *Bacillus megaterium* degrades complex sugars after crop residue breakdown. *Lactobacillus* provides food for the microbes in HYTa and controls the pH of the environment. The *Nitrobacter* organisms oxidize ammonia to nitrite ($NO_2$) while the *Nitrosomonas* microbes oxidize nitrite to nitrate ($NO_3$).

An important property of HYTa is the fixation of atmospheric nitrogen. The nitrogen fixing capability of the microbes in HYTa is enhanced by the assistance of other organisms in HYTa. Nitrogen fixation requires that phosphorous (P), potassium (K) and carbon (C) be available. HYTa contains microbes that are able to decompose P, K, and C within the soil. In addition, the nitrogen fixing bacteria provide a source of nitrogen for the other microbes in HYTa.

Nitrogen fixation may occur in a non-symbiotic manner by the bacteria *Nitrosomonas, Nitrobacter, Azotobacter vinelandii*, and *Clostridium pasteurianum* present in HYTa or in a symbiotic manner as occurs in root nodules by way of the *Rhyzobium* bacteria.

The carbon required by the nitrogen fixing microbes in HYTa is provided by the C decomposers which convert the complex organic compounds in soil into simple compounds such as sugars, alcohols, and organic acids. The C decomposers include many of the above identified microbes.

Phosphorus is necessary for the nitrogen fixing microbes to proliferate and is obtained from the metabolic activity of the P decomposers which convert immobilized phosphorus in the soil into a bio-available phosphorus nutrient. P decomposers in HYTa include *Azotobacter, Bacillus subtilis, Pseudomonas fluorescens* and *Micrococcus luteus*.

The potassium required by the nitrogen fixers is provided by the K decomposer microbes present in HYTa which activate the potassium from the soil. K decomposers in HYTa include *Pseudomonas fluorescens*.

Three important microbes in HYTa are *Bacillus subtilis* (SILoSil® BS) *Bacillus thuringiensis* strains HD-1 and HD-73 (SILoSil® BT), and *Trichoderma harzianum* (TRICHOSIL). These organisms are present ATTC deposit PTA-10973. They were originally obtained from Biotecnologia Agroindustrial S.A. DE C.V., Morelia, Michoacan, Mexico.

*Bacillus subtilis* ((SILoSil® BS) is a Gram positive bacterium which is mesophilic and grows at an optimum temperature between 25 and 35° C. It is aerobic and can grow in anaerobic conditions and utilizes a wide variety of carbon sources. It contains two nitrate reductases, one of which is utilized for nitrogen assimilation. It is capable of secreting amylase, proteases, pullulanases, chitinases, xylanases and lipases.

*Bacillus thuringiensis* (Strains HD-1 and HD-2 (SILoSil® BT)) are Gram Positive anaerobic facultative bacteria, in the form of a peritrichous flagella. Strains HD-1 and HD-73 synthetizes crystals with diverse geometric forms of proteic and insecticide activity during the spore period. Strains HD-1 and HD-2 secret exochitinases when in a chitin containing medium and can be utilized for the degradation of the crustacean residues during the production of chitooligosaccharides.

*Trichoderma harzianum* (TRICHOSIL) is a saprophyte fungus. It exhibits antibiotic action and biological competition and for this reason has biological control properties. It produces enzymes that degrade cell walls or a combination of such activities. It produces glucanases, chitinases, lipases, and extracellular proteases when it interacts with some pathogenic fungi, such as *Fusarium*.

As shown above the metabolism of each group of bacteria are closely interdependent and live in a close symbiotic association for the proper performance of HYTa.

Besides carbon, hydrogen, phosphorus, potassium, sulfur and various trace elements, a mix of special growth factors, such as B complex, free L-amino acids, and ultra-soluble trace elements are important for optimal bacterial growth. Fermenting yeasts are incorporated into HYTa to provide these components. The $N_2$ fixing process requires large amounts of ATP. The amount of ATP naturally present is not enough to fuel biological $N_2$ fixation. The fermentation of the yeast in HYTa compensates for the large energy deficit. During fermentation, organic acids are formed in the respiratory process and together with the phosphorous released by the P decomposers, form ATP. The ATP is used in the biological nitrogen fixation process.

HYTa contains enzymes and beneficial soil microorganisms that replace those that have been depleted due to the excessive use of chemicals which results in diminishing crop yields. By increasing the microbial activity in the soil with HYTa, the bacteria causes the nutrients and micro-elements to be absorbed (mineralized) more efficiently and effectively by plants.

Humus is transformed by some of the microorganisms in HYTa that impregnate both the soil and the radical apparatus of the plant. This process provides increased nutrition to the plant. This increases the nutrients and the essential elements available in the soil that can be absorbed by plants.

The use of HYTa alone or in combination with chitin, chitosan, glucosamine and/or amino acids (1) provides nutrients and elements in the soil that increase crop yields by 25-55%, (2) reduces greenhouse gas emissions, (3) increases the efficiency of mineral fertilizers (3) reduces the use of conventional fungicides and other pesticides, (4) increases the production of plant growth regulators, (5) improves soil structure, tilth, and water penetration and retention, (6) cleans up chemical residues and (7) shifts soil pH toward neutral pH.

Microbial Compositions

HYTa can be used, alone or in combination, with one or more components selected from the group of one or more amino acids, chitin, chitosan and/or glucosamine. In some cases, Acetyl-D-glucosamine can be included in the microbial composition. The microbial composition includes any and all combinations of the aforementioned components. Particularly preferred combinations include: (1) HYTa and chitin; (2) HYTa and chitosan; (3) HYTa and glucosamine; (4) HYTa and amino acids; (5) HYTa, chitin and amino acids; (6) HYTa, chitin, chitosan and amino acids; (7) HYTa, chitosan, glucosamine and amino acids; (8) HYTa, chitosan and glucosamine and (9) HYTa, chitin, chitosan, glucosamine and amino acids, the latter being particularly preferred. HYTb and in particular HYTd are the preferred sources for chitosan, glucosamine and amino acids.

When HYTa is grown in the presence of chitin, chitosan and/or amino acids it may contain residual chitin, chitosan and/or amino acids. Under such circumstances, the HYTa culture constitutes the disclosed microbial composition and can be applied directly to soil, seed, seedlings or plant foliage. Alternatively, one or more of the second components can be added to supplement the second components in the composition or to change its composition.

As used herein, the term "amino acids" refers to a composition containing two or more amino acids. Amino acids include tryptophan, histidine, threonine, tyrosine, valine, methionine, isoleucine, leucine, phenylalanine, lysine, aspartic acid, cysteine, glutamic acid, glutamine, serine, glycine, alanine, proline, asparagine and arginine. In preferred embodiments, amino acids are provided by use of HYTb (See below).

As used herein, the term "chitin" refers to a biopolymer consisting predominantly of repeating units of beta-1-4-linked N-acetyl-D-glucosamine. Chitin is found in the natural environment as a primary structural material of the exoskeleton of animals such as Arthropoda, e.g., crustaceans, insects, spiders, etc., Mollusca, e.g., snails, squid, etc., Coelentara, e.g., organisms such as hydroids and jellyfish, and Nematoda, such as unsegmented worms. Chitin is also found in various fungi including members of the genus *Fusarium*. Chitin can be extracted from these natural sources by treatment with alkali, or by a biodegradation process. The molecular weight of chitin varies depending on its source and method of isolation. In preferred embodiments, the chitin is derived as a solid from the biodegradation of chitin containing Arthropods as described in the Bioderpac applications. It is preferred that the chitin have a diameter of about 50 to 75 microns to facilitate its application via drip and spray irrigation systems.

As used herein, the term "chitosan" is a polysaccharide consisting predominantly of repeating units of D-glucosamine. Chitosan is obtained by deacetylation of chitin. The degree of deacetylation as compared to chitin is preferably greater than 50%, 60%, 70%, 80%, 85%, 90% and 95%. It is preferred that the level of deacetylation be sufficient to render the chitosan water soluble at acidic pH. The molecular weight of chitosan varies depending on its source and method of isolation. Chitosan includes chitosan oligomers. In preferred embodiments, chitosan is precipitated at pH 9.0 from the aqueous fraction obtained from the biodegradation of chitin containing Arthropods such as described in the Bioderpac applications.

As used herein, the term "chitosan oligomer" refers to chitosan having 2 or more repeating units of D-glucosamine and, in the case of incomplete deacetylation of chitin, one or more units of N-acetyl-D-glucosamine. In preferred embodiments, the chitosan oligomers are derived from the aqueous fraction generated in the biodegradation of chitin containing Arthropods such as described in the Bioderpac applications. In some embodiments chitosan oligomers are used as the second component of the microbial composition.

As used herein, the term "glucosamine" refers to an amino monosaccharide. In preferred embodiments it is the sugar residue that forms the backbone of the biopolymers chitin and chitosan. Glucosamine is present in the aqueous fraction generated during the biodegradation of chitin containing Arthropods such as described in the Bioderpac applications. Glucosamine induces plants to make chitinase as a defense to chitin containing pathogens.

HYTb and HYTc

As used herein, the term "HYTb" refers to the aqueous fraction and "HYTc" refers to the solid fraction obtained from the biodegradation of chitin containing Arthropods such as described in U.S. patent application Ser. No. 61/289,706, filed Dec. 23, 2009 entitled "Biodegradation of Crustacean By-products", U.S. patent application Ser. No. 61/299,869, filed Jan. 29, 2010 entitled "Biodegradation Process and Microbial Composition" and U.S. patent application Ser. No. 61/355,365 filed Jun. 16, 2010 entitled "Biodegradation Process and Composition" and PCT/EP2010/070285 filed Dec. 20, 2010 entitled Biodegradation Process and Composition, each of which is incorporated herein by reference in its entirety.

Briefly, in the arthropod biodegradation process a microbial composition is used to degrade the arthropod or waste components of the arthropod. It is a lactic acid fermentation process. The microbial composition contains microbes that produce enzymes that can degrade the chitin containing components of the arthropod to chitin, chitosan, N-acetyl glucosamine and glucosamine. It also contains microbes that produce enzymes that can degrade proteins and fats to produce amino acids and lipids.

A preferred microbial composition for arthropod degradation is referred to as HQE. HQE was deposited with the American Type Culture Collection (ATCC) Manassas, Va., USA on Apr. 27, 2010 and given Patent Deposit Designation PTA-10861.

In a preferred embodiment, the marine arthropod is a crustacean and the preferred crustacean is shrimp. Shrimp by-product comprises shrimp cephalothorax and/or exoskeleton.

In the biodegradation process, it is preferred that the fermentation be facultative aerobic fermentation. It is also preferred that the fermentation is carried out at a temperature of about 30° C. to 40° C. The pH is preferably less than about 6, more preferably less than about 5.5. However, the pH should be maintained above about 4.3. The fermentation is carried out for about 24-96 hours. In some embodiments, the fermentation is carried out for about 24-48 hours and more preferably 24-36 hours. These fermentation times are far shorter than the typical prior art fermentation times of 10 to 15 days to achieve substantially the same amount of digestion, albeit without detectable formation of chitosan and glucosamine.

The separation of the mixture is preferably by centrifugation (e.g. about 920 g). Gravity separation can also be used but is not preferred because of the time required to achieve separation.

The mixture separates in to three fractions: solid, aqueous and lipid. The solid fraction comprises chitin and is designated HYTc. The aqueous fraction comprises protein hydroysate, amino acids, chitosan and glucosamine and is designated HYTb. The lipid fraction comprises sterols, vitamin A and E and carotenoid pigments such as astaxanthine.

It is preferred that HQE be used in the biodegradation process. In other embodiments, it is preferred that previously prepared HYTb be added to HQE or the fermentation broth. As described above, HYTb contains amino acids, chitosan, glucosamine and trace elements including calcium, magnesium, zinc, copper, iron and manganese. HYTb also contains enzymes such as lactic enzymes, proteases, lipases, chitinases, lactic acid, polypeptides and other carbohydrates. HYTb can also contain dormant microorganisms from a prior biodegradation process. Such microorganisms can become reactivated and, in combination with HQE, contribute to a more robust biodegradation process as compared to when HQE is used by itself as otherwise described herein More particularly, the process includes the following steps:
a. Activation of the microbial cells in a sugar base solution to enhance its growth and the biomass formation.
b. Milling of the shrimp by-products (cephalothorax and exosqueleton) to make a homogeneous paste.
c. Homogeneous mixing of the shrimp by-product paste with at least 10% of the activated inoculum.
d. Adjustment of the pH values to less than 6.0 in the mixture using a citric acid solution to inhibit the growth of microorganisms and to promote the development of microbial cells that constitute the inoculum.
e. Fermentation of the mixture in a non-continuous agitated system at temperatures within a range of 30 to 40° C. at least for at least 96 hours maintaining pH at less than 5.0. The pH is monitored periodically. If the pH rises above 5.0, a citric acid buffer is added in an amount to maintain the pH below 5.0.
f. Centrifugation of the ferment to separate the three principal fractions: chitin, liquid hydrolysate and pigmented paste.
g. Rinsing of the crude chitin and recollection of the rinse water to recuperate fine solids or minerals.
h. Drying of the chitin and storage.
i. Drying and storage of the liquid hydrolysate.
j. The pigmented paste (lipid fraction) is stored in closed recipients for conservation.

The process and operational fundamentals are better understood with reference to the following detailed description.

Activation of Microbial Cells

A microbial composition as disclosed herein is used as inoculum. The inoculum of HQE has a concentration of microbes of about 2.5 to 3.0% (w/v). HQE is activated by dilution to 5% in sugar cane solution (3.75% final concentration of sugar cane), and incubated at 37° C. for 5 days. HYTb (10 ml per liter of culture) is preferably added to provide a source of minerals and naturally derived amino acids. The cellular growth of the microorganisms was estimated by optical density measured at 540 nm. The activation is complete at an optical density of about 1.7. The concentration of microbes after activation is about 1.9 to 3.0% (w/v).

Preparation of Samples

The shrimp by-products samples are obtained from shrimp processing plants. Slightly thawed and minced residue (1500 g by batch) is mixed with 99 grams of sugar cane (final concentration 6.6% wt %) and 85.5 ml of activated HOE 5% (v/w) (optical density of cell=1.7). Then the pH is adjusted to 5.5 using 2 M citric acid.

Fermentation Control

The mixture is incubated at 36° C. with a non-continuous agitation for 96 h. During the fermentation process, the pH is monitored by using a potentiometer, and the total titratable acidity (TTA, %) was determined by titration with 0.1 N NaOH until a pH of 8.5 is obtained. The TTA is expressed as a percentage of lactic acid.

Conditions of Separation

The fermentation product is a viscous silage which has an intense orange color, due to the astaxanthine presence. The ensilage is centrifuged (5° C.) at 1250 rpm (930 g) for 15 min to obtain the chitin, the liquid hydrolysates, and the pigment paste. The upper phase (pigment paste) is separated manually. The liquid hydrolysates are separated by decantation, and the sediment that constitutes the raw chitin is washed with distilled water to separate fine solids. The resulting liquid is collected and dried. The raw chitin, liquid hydrolysates and fine solids are dried at 60° C. All the fractions are stored to protect them from light.

Other microbial compositions for the production of HYTb and HYTc are set forth in the following Table 2.

TABLE 2

Culture Composition

| Microorganism | 1 | 2 | 3 | 4 | 5 | 6 | 7 | 8 | 9 | 10 |
|---|---|---|---|---|---|---|---|---|---|---|
| Bacillus subtilis | X | X | X | X | | X | X | X | | X |
| Bacillus cereus | X | X | | X | | X | | X | | X |
| Bacillus megaterium | X | X | | | | | | | | |
| Azotobacter vinelandii | X | X | | X | | X | | X | | X |
| Lactobacillus acidophilus | X | X | X | X | X | | X | X | X | |
| Lactobacillus casei | X | X | | X | X | | | X | X | |
| Trichoderma harzianum | X | X | X | X | | X | X | X | | X |
| Rhizobium japonicum | X | X | | X | | X | | X | | X |
| Clostridium pasteurianum | X | X | | | X | X | | | X | X |
| Bacillus licheniformis | X | X | X | | X | X | X | | X | X |
| Pseudomonas fluorescens | X | X | X | | X | X | | | | |
| Bacillus thuringiensis | X | | | | | X | X | X | X | X |
| Streptomyces | X | | | | X | X | X | X | X | X |
| Nitrobacter | X | | | | | | X | X | X | X |
| Micrococcus | X | | | | | | X | X | X | X |
| Proteus vulgaris | X | | | | | | X | X | X | X |

These microorganisms are preferably derived from HOE and are referred to as *Bacillus subtilis* ((SILoSil® BS), *Bacillus cereus* (Bioderpac, 2008), *Bacillus megaterium* (Bioderpac, 2008), *Azotobacter vinelandii* (Bioderpac, 2008), *Lactobacillus acidophilus* (Bioderpac, 2008), *Lactobacillus casei* (Bioderpac, 2008), *Trichoderma harzianum* (TRICHOSIL), *Rhizobium japonicum* (Bioderpac, 2008), *Clostridium pasteurianum* (Bioderpac, 2008), *Bacillus licheniformis* (Bioderpac, 2008), *Pseudomonas fluorescens* (Bioderpac, 2008), *Bacillus thuringiensis* strains HD-1 and HD-73 (SILoSil® BT), *Streptomyces* (Bioderpac, 2008), *Micrococcus* (Bioderpac, 2008), *Nitrobacter* (Bioderpac, 2008) and *Proteus* (Bioderpac, 2008). Each of these organisms can be readily isolated from HOE and recombined to form the disclosed microbial composition to degrade arthropods to make HYTb and HYTc.

HYTb

HYTb contains amino acids (about 12 wt %), chitosan (about 1.2 wt %), glucosamine (about 1 wt %) and trace elements (about 6 wt %) including calcium, magnesium, zinc, copper, iron and manganese. It also contains enzymes such as lactic enzymes, proteases, lipases, chitinases among others, lactic acid, polypeptides and other carbohydrates. The specific gravity of HYTb is typically about 1.050-1.054. The average amino acid content in HYTb for certain amino acids is set forth in Table 3.

TABLE 3

Amino acid profile dry powder hydrolysates (mg per g dry weight)

| Amino acid | Dry powder hydrolysates |
|---|---|
| Aspartic acid | 38 |
| Glutamic acid | 39 |
| Serine | 16 |
| Histidine | 9 |
| Glycine | 28 |
| Threonine | 14 |
| Alanine | 36.1 |
| Proline | 25.8 |
| Tyrosine | 70 |
| Arginine | 22.2 |
| Valine | 20 |
| Methionine | 16.4 |
| Isoleucine | 18.3 |
| Tryptophan | 3.1 |
| Leucine | 23 |
| Phenylalanine | 39 |
| Lysine | 13 |
| Total | 431 |

In some embodiments, HYTb can constitute a second component that is either combined with HYTa or used separately as a soil amendment and/or as a foliage spray.

HYTc

The primary component of HYTc is chitin. It has an average molecular weight of about 2300 Daltons and constitutes about 64 wt % of the composition. About 6% of HYTc contains minerals including calcium, magnesium, zinc, copper, iron and manganese, about 24 wt % protein and 6% water. It has a specific gravity of about 272 Kg/m$^3$. In some embodiments, HYTc can constitute a second component that is either combined with HYTa or used separately as a soil amendment and/or as a foliage spray.

HYTa is preferably used with HYTb and HYTc either in combination or separately as a soil amendment or foliage spray.

The microbes in HYTa require the trace elements calcium, magnesium, sulfur, boron, manganese, zinc, molybdenum, iron, copper, sodium, and silicon. These important trace elements can be often obtained from toxic chemical reactions which are not suitable for organic certified products. Accordingly, it is preferred that these trace elements be obtained from an organic source such as HYTb and/or HYTc.

HYTd

HYTd is obtained by fermenting chitin with a microbial composition such as HQE suspended in HYTb. The process is similar to that described above for the production of HYTb and HYTc except that the substrate is chitin, e.g. HYTc, rather than chitin containing Arthropods.

Figure 12:
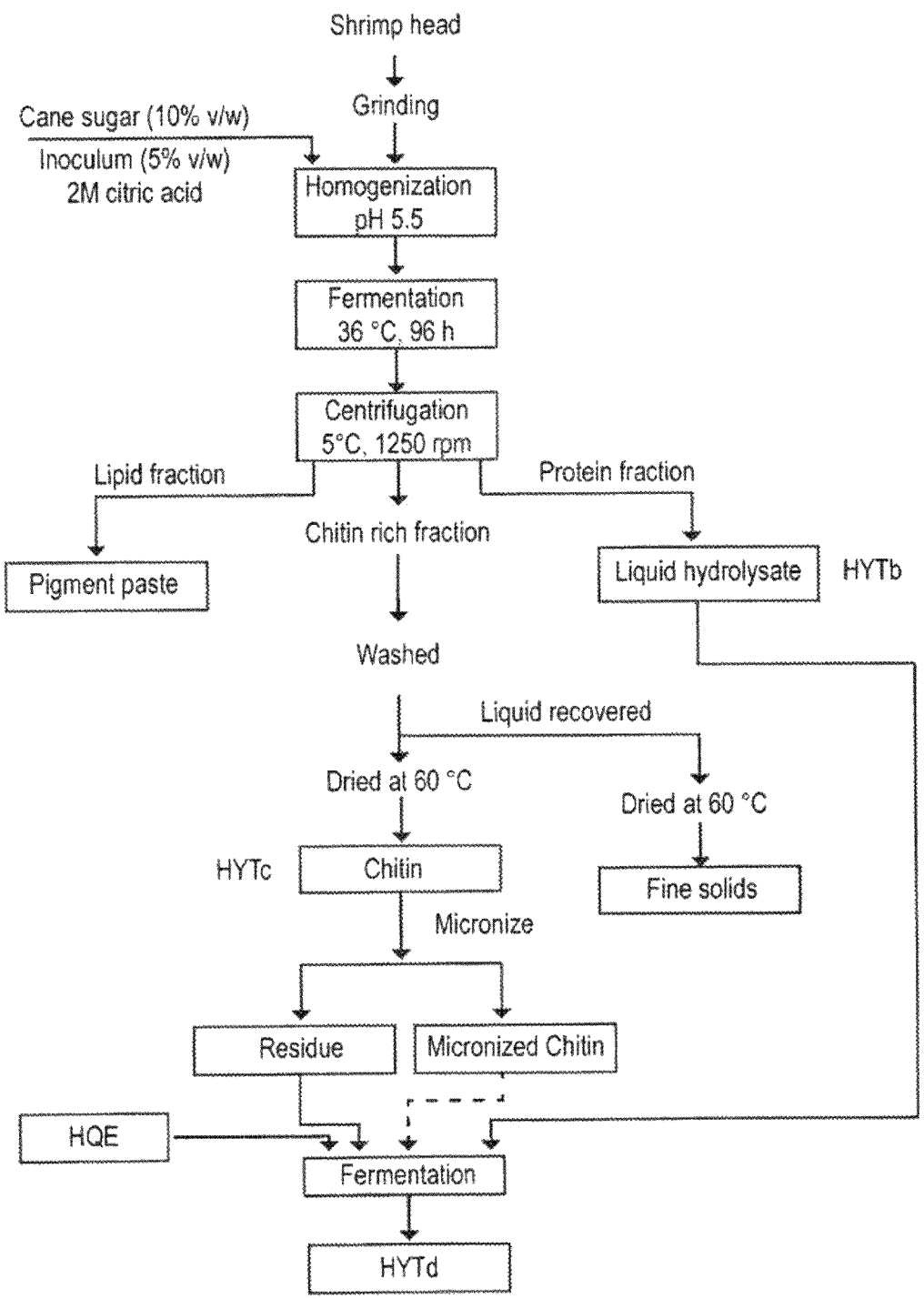
FIG. 12 is a flow diagram showing the digestion of crustacean to form HYTb and HYTc. The HYTc and HYTb are subsequently processed with HQE to form HYTd, a solution with relatively high amounts of chitosan and glucosamine as compared to HYTb.

FIG. 12 is a flow diagram showing the digestion of crustacean to form HYTb and HYTc. The HYTc and HYTb are subsequently processed with HQE to form HYTd, a solution with relatively high amounts of chitosan and glucosamine as compared to HYTb.

Figure 13:
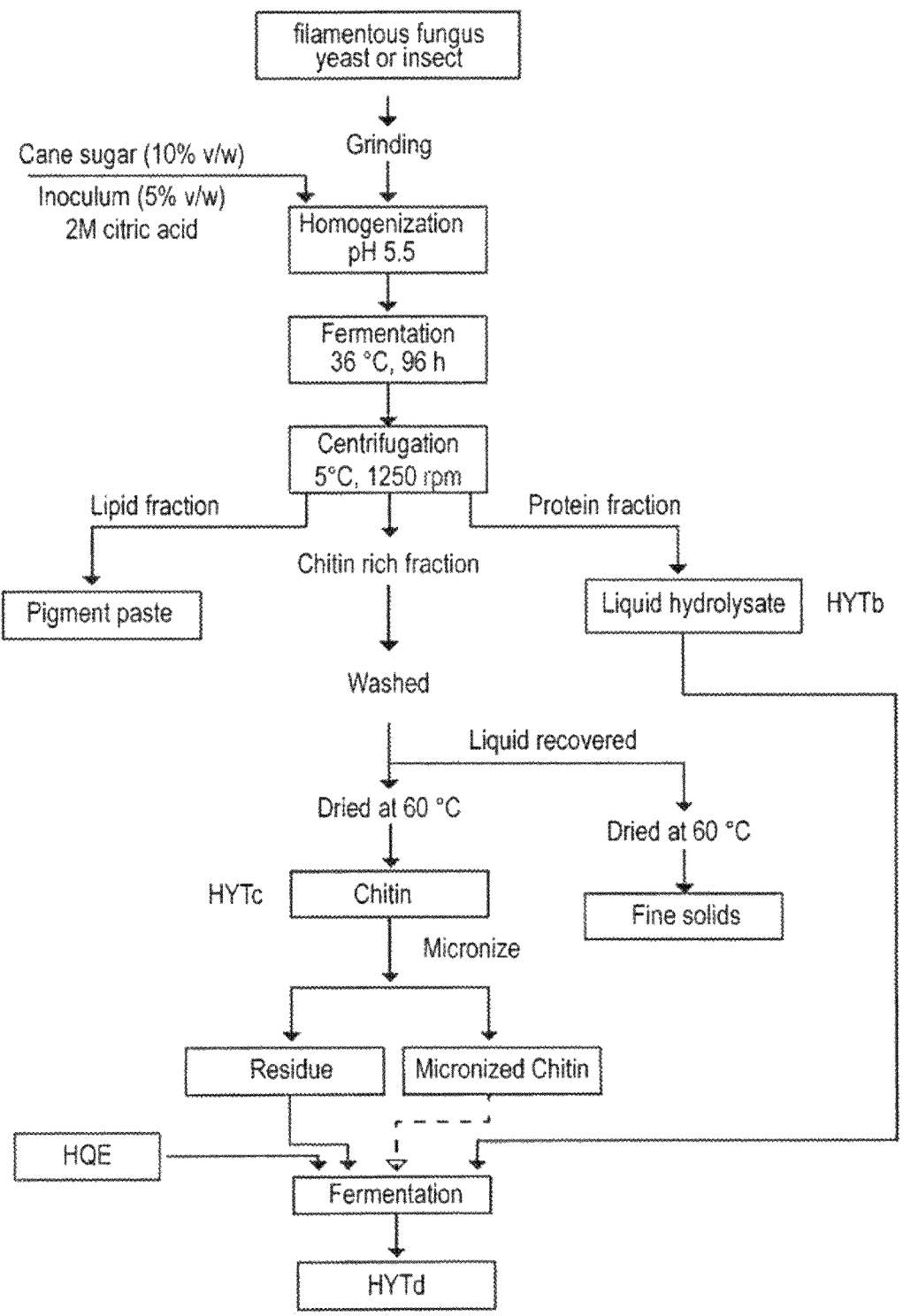
FIG. 13 is a flow diagram showing the digestion of fungi, including filamentous fungi, yeast and/or insects to form HYTb and HYTc. The HYTc and HYTb are optionally processed further with HQE to form HYTd, a solution with relatively high amounts of chitosan and glucosamine as compared to HYTb.

FIG. 13 is a flow diagram showing the digestion of fungi, including filamentous fungi, yeast and/or insects to form HYTb and HYTc. The HYTc and HYTb are processed further with HQE to form HYTd.

HYTb already contains chitosan (about 0.5-1.5 wt %) and glucosamine (about 0.5-1.5 wt %). The amount of chitosan and glucosamine in HYTd ranges from about 2 wt % to 2.5 wt % chitosan and from about 2 wt % to 5 wt % glucosamine. This represents an increase in the amount of chitosan and glucosamine as compared to HYTb of about 0.5 wt % to 2.5 wt % chitosan and from about 0.5 wt % to 5 wt % glucosamine.

HYTd when undiluted is similar to HYTb but contains higher amounts of chitosan and glucosamine. HYTd contains amino acids (about 5 to 12 wt %) and trace elements (about 6 wt %) including calcium, magnesium, zinc, copper, iron and manganese. It also contains enzymes such as lactic enzymes, proteases, lipases, chitinases among others, lactic acid, polypeptides and other carbohydrates. In some embodiments, the degree of acetylation of the produced chitosan is 20% or less, preferably 15% or less, more preferably 10% or less, still more preferably preferable 8% or less and most preferably 5% or less. The average amino acid content in HYTd for certain amino acids is similar to HYTb. See Table 3.

HYTd preferable comprises 12 wt % L-amino acids (Aspartic acid, Glutamic acid Serine, Histidine, Glycine, Threonine, Alanine, Proline, Arginine, Valine, Methionine, Isoleucine, Tryptophan, Phenylalanine, Lysine and threonine) and 5 wt % glucosamine and chitosan. HYTd also preferable contains one or more or all of soluble minerals (P, Ca, Mg, Zn, Fe and Cu), enzymes and lactic acid from the chitin digestion process as well as other polysaccharides.

As used herein the term "glucosamine" includes glucosamine or a mixture of glucosamine and N-acetyl glucosamine. In most embodiments, HYTd contains glucosamine and N-acetyl glucosamine.

HYTd can also contain particulate chitin that has not been completely digested. In general the fermentation mixture is filtered to remove large particles of chitin. The filtrate contains usually no more than 2 wt % chitin.

Activation of HYTa

The aforementioned microbial compositions can be used to treat soil, seeds, seedlings and/or plant foliage. However, HYTa is first activated before use.

In preferred embodiments, HYTa is activated by incubating an inoculum of HYTa in an aqueous solution for 24-168 hours to allow the microbes to grow and reproduce before being used in the process of treating soil, seeds, seedlings and/or plant foliage. The conditions of the incubation influence the overall initial properties of HYTa.

In one embodiment, an inoculum of HYTa is diluted with water in a ratio of 1/100 and allowed to incubate at a temperature of approximately 36° C. at a pH of 6.8-7.1 for about 24 to about 168 hours (7 days). HYTb can optionally be used during this activation. The nitrogen fixing microbes *Azotobacter vinelandii* and *Clostridium pasteurianum* proliferate under reduced nitrogen growth conditions. In addition, as the oxygen concentration decreases, Lactobacilli, including *Lactobacillus acidophilus* and *Lactobacillus casei*, proliferate. The colony forming units (CFUs) for some of the bacteria in activated HYTa are set forth in Table 3:

TABLE 4

| | |
|---|---:|
| *Azotobacter vinelandii* | 101,050,000 Cfu/mL |
| *Clostridium pasteurianum* | 104,275,000 Cfu/mL |
| *Bacillus subtilis* | 1,100,000 Cfu/mL |
| *Bacillus cereus* | 25,000 Cfu/mL |
| *Bacillus megaterium* | 10,000 Cfu/mL |
| *Lactobacillus* | 500,000 Cfu/mL |
| *Nitrobacter* | 5,000 Cfu/mL |
| *Nitrosomonas* | 2,500 Cfu/mL |
| Total | 206,967,000 Cfu/mL |

The HYTa obtained after this incubation retains the beneficial properties of HYTa but is particularly suited as a soil amendment for treatment of nitrogen-depleted soils given the nitrogen-fixation capabilities of *Azotobacter vinelandii* and *Clostridium pasteurianum*.

If soil pathogens such as filamentous fungi from the genus *Fusarium* or nematodes are present, or believed to be present, HYTa can be activated under substantially the same conditions but in the presence of chitin. The chitin stimulates the expansion of the chitin responsive microbes such as *Pseudomonas fluorescens, Trichoderma harzianum, Bacillus thuringiensis, Streptomyces* sp., *Nitrobacter* sp., *Micrococcus* sp., and *Bacillus subtilis*. HYTa obtained under these conditions has an antifungal, fungicidal, antinematode, nematodicidal and insecticidal properties to the extent such pathogens contain chitin. Such microbial compositions can be applied directly to the soil or to seed, seedlings and/or plant foliage. Such microbial compositions also have the ability to fix nitrogen as in the aforementioned incubation in the absence of chitin.

In addition to incubating with chitin, HYTa can be activated with chitin and amino acids. A preferred source of chitin is HYTc. When HYTc is used the protein and minerals in HYTc are also present during the activation.

Further, HYTa can be activated in the presence of amino acids and chitosan. A preferred source of amino acids and chitosan is HYTb and/or HYTd. When HYTb and/or HYTd is used glucosamine and the other components of HYTb and/or HYTd or are also present during the activation.

Optionally, HYTa can be incubated with chitin, amino acids and chitosan. A preferred source of chitin is HYTc. A preferred source for amino acids and chitosan is HYTb and/or HYTd. When HYTb, HYTd and HYTc are used the other components in these formulations are also present during activation.

Use of Activated HYTa

Activated HYTa can be used alone or in combination with other components such as chitin, (e.g. HYTc) chitosan, glucosamine and amino acids (e.g. HYTb and/or HYTd) to treat soil, seed, seedlings or foliage. In some embodiments, combinations of these components can be applied as a mixture. In other embodiments, they can be applied separately. In still other embodiments, the components can be applied at different times.

In one embodiment, activated HYTa can be applied to soil, seeds or seedlings, or used in foliar applications by direct application to foliage. However, when plant pathogens are present, it is preferred that microbial composition comprises activated HYTa, chitin and/or chitosan. Alternatively, the HYTa can be activated in the presence of chitin. Chitosan is known to have bactericidal, fungicidal, and antiviral properties, as well as its ability to stimulate plant growth and to induce plant resistance to pathogens. In other embodiments, glucosamine is a part of the microbial composition In a preferred embodiment, the activated HYTa alone or in combination with chitin (preferably HYTc) and/or chitin, chitosan, and amino acids (preferably HYTb, HYTd and/or HYTc), is applied to soil, seeds, seedlings and/or foliage. It is preferred that HYTa be used in combination with chitin, chitosan, glucosamine and amino acids. HYTc is the preferred source of chitin while HYTb and/or HYTd are the preferred source of chitosan, glucosamine and amino acids However, the components of the microbial composition namely HYTa, chitin, chitosan, glucosamine and amino acids can be applied separately or in any combination or sub-combination. They can be applied at the same time or sequentially, in any given order. However, the preferred mode of application is to initially apply all at the same time. The application of the foregoing components provide for the direct treatment of plant pathogens, the induction of plant pathogen resistance pathways, and the nourishment of the HYTa microbes, the indigenous nonpathogenic soil flora, and the plant.

When soil is initially treated with a microbial composition comprising activated HYTa alone, the microbes present in the composition have an opportunity to populate the soil and to alter its taxonomic composition. In some situations, the initial colonization by HYTa provides little or no nutrients to the plant. In such instances, it is important to maintain a nutrient reserve to sustain both the growth of the microbes while colonizing the rhizosphere and the growth of the plants in the soil. It may be necessary to repeat the application of HYTa, depending on the plant's growth cycle and nutritional regime. In other cases, it may be sufficient to provide additional applications of amino acids, chitin and/or chitosan, e.g., HYTb and HYTc, to the previously treated soil.

When HYTa is used in combination with, for example, HYTb, HYTd and/or HYTc, addition nutrients are available to the HYTa microbes and the plants present in the treated soil.

Table 5 sets forth a typical fourteen week program for the application of HYTa, HYTb and HYTc to drip irrigated crops cultivated in soil. The values are per hectare. For HYTa and HYTb, the values represent liters per week. For HYTc, the values represent kilograms per week.

exchange capacity, low water holding capacity, low organic matter content and low levels of available nutrients is present. In general, infertile soil does not support vigorous plant growth and/or produces low crop yields.

For non-soil systems such as hydroponics, the same protocol applies but with a daily distribution following the ferti-irrigation program.

The microbial compositions can be used in connection with any plant including but not limited to alfalfa, banana, barley, broccoli, carrots, corn, cucumber, garlic, grapes, leek, melon, onion, potato, raspberry, rice, soybean, squash, strawberry, sugarcane, tomato and watermelon.

When applied as a soil amendment, the microbial composition containing HYTa, chitin, amino acids and chitosan enhances crop production on average about 25%-55% as compared to the 15-25% increase in crop production observed for E2001. From Karl Co. SA de CV, Navojoa, Sonora, Mexico.

The microbial composites can also result in a decrease in the amount of chitin used. For example, chitin has been used as a soil amendment in the prior art. Typically, about 600 kg of chitin were used per hectare. However, beneficial effects of such use were not observed for up to six months. When HYTa was activated in the presence of chitin and then combined with chitin and applied as a soil amendment, beneficial effects were observed after seven days with the use of only 4-6 kg of chitin per hectare.

TABLE 5

| | Lts/kg/Week | | | | | | | | | | | | | |
|---|---|---|---|---|---|---|---|---|---|---|---|---|---|---|
| | W 1 | W 2 | W 3 | W 4 | W 5 | W 6 | W 7 | W 8 | W 9 | W 10 | W 11 | W 12 | W 13 | W 14 |
| HYT-A | 3 | 0 | 0 | 1 | 0 | 1 | 0 | 1 | 0 | 1 | 0 | 1 | 0 | 1 |
| HYT-B | 10 | 5 | 0 | 3 | 2 | 3 | 2 | 3 | 2 | 3 | 2 | 3 | 2 | 3 |
| HYT-C | 1 | | | 1 | | | | 1 | | | | 1 | | |

The pulse in which the microbial composition is injected to the irrigation system should be one in which the microbial composition is able to reach the root system and stay there over night while the system is off. For maximum performance of HYTc, it should be applied at the same time as a mixture with HYTa. The protocol should be continued as long as the plant continues in production. This protocol covers all plant stages including germination, root formation, plant growth, flowering, fruit setting, fruit formation harvesting and re-harvest. This protocol is designed for maximum yield potential covering nutritional aspects, bio-stimulation aspects and protection against diseases such as nematodes and fungi.

The process can be carried out by contacting soil to form a treated soil. In some cases the process is repeated. In some cases, plants, seedlings or seeds are already present in the soil prior to treatment with the microbial composition. In other cases, plants, seedlings or seeds are transplanted to the soil after treatment with the microbial composition.

In general, before application the number of hectares or acres to be treated is determined. Then the recommended amount of activated HYTa per hectare or acre is multiplied by the area to be treated and diluted in sufficient water to irrigate or spray the soil or crop on the area to be treated. The same procedure can be followed for liquid HYTb and/or HYTd. HYTc, being a solid, can be applied directly as a solid or as a suspension in water. HYTc is preferably ground to micron size particles prior to use.

The process can be carried out with infertile soil. Such soils generally are those were at least one of low cation Although the disclosure is directed primarily to the use of the disclosed microbial compositions, HYTb, HYTc and/or HYTd for agricultural applications, such compositions or their components and processes can also be used in horticultural applications to improve the production of foliage and flowers and decrease the use of conventional insecticides and fungicides.

When HYTd and activated HYTa, HYTb, and/or HYTc is applied to soil, seed seedling or foliage it forms treated soil, treated seed, treated seedling, treated foliage and treated plants. HYTd is also a novel composition. Therefore, the soil, seed, seedling, foliage and plants treated with HYTd and HYTa, HYTb and/or HYTc are also novel. Since HYTd, HYTa, HYTb and HYTc are generally diluted prior to application, the soil, seed, seedlings and foliage will typically contain the components of HYTd, HYTa, HYTb and/or HYTc in diluted form.

Soil treated with HYTa is defined as soil that contains one or more microbes that are unique to HYTa dispersed within the treated soil. Such microbes can be detected in the treated soil genetically by using a BioChip that detects microbial populations based on DNA. See e.g. US Patent Publication 2007/0015175, incorporated herein by reference. Other methods, such as PCR, which know to those skilled in the art can also be used. Microbes in HYTa that are particularly preferred are *Bacillus subtilis* (SILoSil® BS), *Bacillus thuringiensis* strain HD-1, *Bacillus thuringiensis* strain HD-73 (SILoSil® BT) and *Trichoderma harzianum* (TRICHOSIL) each of which can be isolated from the HYTa deposit or obtained from Biotecnologia Agroindustrial S.A. DE C.V., Morelia, Michoacan, Mexico. *Trichoderma harzianum* (TRICHOSIL) is most preferred as it is important during the activation of HYTa in that it causes inter-component synergies among the other microbes in HYTa. Identification of one or more of these microorganisms can be further combined with the identification of other microbes in HYTa, if necessary, to confirm the presence of HYTa or that HYTa was present. *Trichoderma harzianum* (TRICHOSIL) was deposited with the ATCC on Oct. 6, 2011 and given Patent Deposit Designation PTA-12152. *Bacillus subtilis* (SILoSil® BS) was deposited with the ATCC on Oct. 7, 2011 and given Patent Deposit Designation PTA-12153. *Bacillus thuringiensis* strains HD-1 and HD-73 (SILoSil® BT) was deposited with the ATCC on May 31, 2012 and given Patent Deposit Designation PTA-12967.

Treated seed, seedlings, foliage and plants are similarly defined. In these cases, the microbes of HYTa are found on the surfaces of the treated seed, seedlings, foliage and plants.

As used herein, the term "consisting essentially of" in connection with HYTa, HYTb and HYTc means any of HYTa, HYTb and/or HYTc alone or in combination without additional microbes.

Process to Make HYTd

The process to make HYTd is disclosed in U.S. patent application Ser. No. 61/500,527 filed Jun. 23, 2011 entitled Process for Making Chitin and Chitin Derivatives which is expressly incorporated herein by reference.

Briefly, HQE, or related chitin degrading microbial compositions, is activated and added to HYTb. Solid chitin is added and the mixture is fermented for 3 to 7 days. The chitin can be obtained from HYTc or other sources such as the chemical treatment or biodegradation of chitin containing fungi, filamentous fungi, yeasts and/or insects. HYTc is the preferred source of chitin. The chitin is preferably micronized. The micronized chitin or the residual chitin can be used.

Use of HYTd

HYTd can be used as I biostimulant of root and foliage growth and as a fungicide.

If used alone as a fungicide, it is preferred that 20 liters be applied per hectare.

If used to treat stressed plants it is preferred that HYTd be applied at 3 to 10 liter per hectare.

HYTd can also be applied at 3 to 5 liter per hectare.

HYTd can be applied directly to soil, foliage or both. HYTd can be used in conjunction with other components such as HYTb, HYTc and/or HYTa. When used with other components, HYTd can be combined with the component to form novel compositions. Such compositions can be applied directed to the spoil or plant. Alternatively, HYTd and one or more of HYTa, HYTb and/or HYTc can be applied separately or at different times.

Example 1

The following protocol was applied to the soil of asparagus plants.

TABLE 6

| Test | HYTa | HYTb | HYTc | HYTd |
|---|---|---|---|---|
| 1 | 0 | 0 | 0 | 0 |
| 2 | 3 liters/hectare then 1 liter/hectare every 45 days | 0 | 0 | 0 |
| 3 | 3 liters/hectare then 1 liter/hectare every 45 days | 2 liters/hectare then 1 liter/hectare every 12 days | 0 | 0 |
| 4 | 3 liters/hectare then 1 liter/hectare every 45 days | 5 liters/hectare then 2 liters/hectare every 12 days | 0 | 5 liters/hectare then 2 liters/hectare every 12 days |

Figure 2:
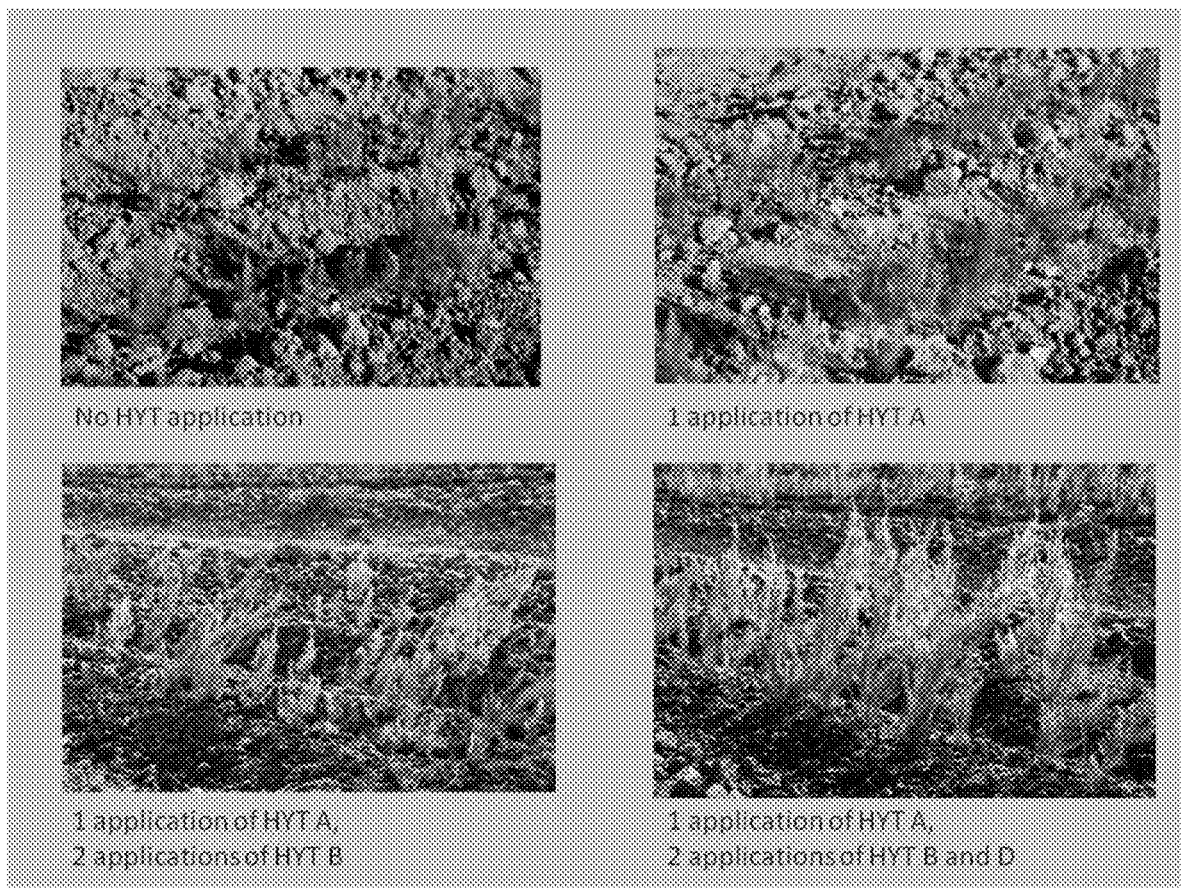
FIG. 2 shows the results of treating asparagus with HYTa+HYTb+HYTd.

The results are shown in FIGS. 1 and 2. As can be seen with no application of any HYT product a relatively small plant is obtained with poor root development. As one progresses through tests 2, 3 and 4, it is apparent that each treatment results in improved foliage and root development.

Example 2

This example demonstrates the benefit of treating potatoes with HYTa as compared to a control.

The soil contained 1% or less of organic matter and had a pH between 7.3 and 7.5 The following was applied per hectare over the course of the trial:

400 to 600 kg of ammonium sulfate.
  250 to 400 kg of 11-52-0, phosphorus.
  300 kg of potassium sulfate
  150 to 200 kg of potassium nitrate
  50 to 100 kg of magnesium sulfate
  25 to 50 kg of zinc sulfate
  HYTa—10 L Two liters of HYTa was applied to each hectare of soil with the first application of water. At planting, 4 liters of HYTa per hectare was applied to the soil. After stolon development 2 liters of HYTa per hectare was applied to the soil. When the potatoes were about 4 cm in size, 2 liters of HYTa per hectare was applied to the soil.

The results are presented in Table 7.

TABLE 7

| | TEST HYT + A | | CONTROL | | DIFFERENCE | | % IN RELATION TO CONTROL | |
|---|---|---|---|---|---|---|---|---|
| Size | Pieces | Kilos | Pieces | Kilos | Pieces | Kilos | Pieces | Kilos |
| GIANT | 0 | 0.00 | 0 | 0.00 | 0 | 0.00 | | |
| 1st | 4 | 1.20 | 1 | 0.30 | 3 | 0.91 | 300% | 307% |
| 2d | 18 | 3.33 | 11 | 1.93 | 7 | 1.41 | 64% | 73% |
| 3d | 21 | 2.74 | 25 | 3.37 | −4 | −0.63 | −16% | −19% |
| 4ta | 71 | 3.24 | 118 | 5.27 | −47 | −2.03 | −40% | −39% |
| MONO | 6 | 0.79 | 7 | 1.30 | −1 | −0.51 | −14% | −39% |
| TOTAL | 120 | 11.3 | 162 | 12.1 | −42 | −0.86 | −26% | −7% |

Figure 3:
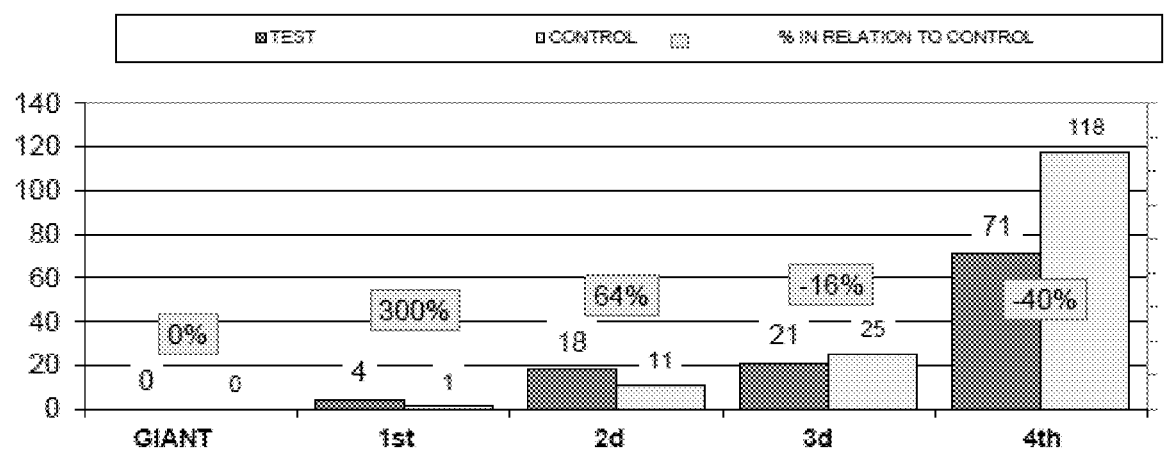
FIG. 3 is a graph which shows the number of pieces and size distribution of potatoes treated with HYTa as compared to control.
Figure 4:
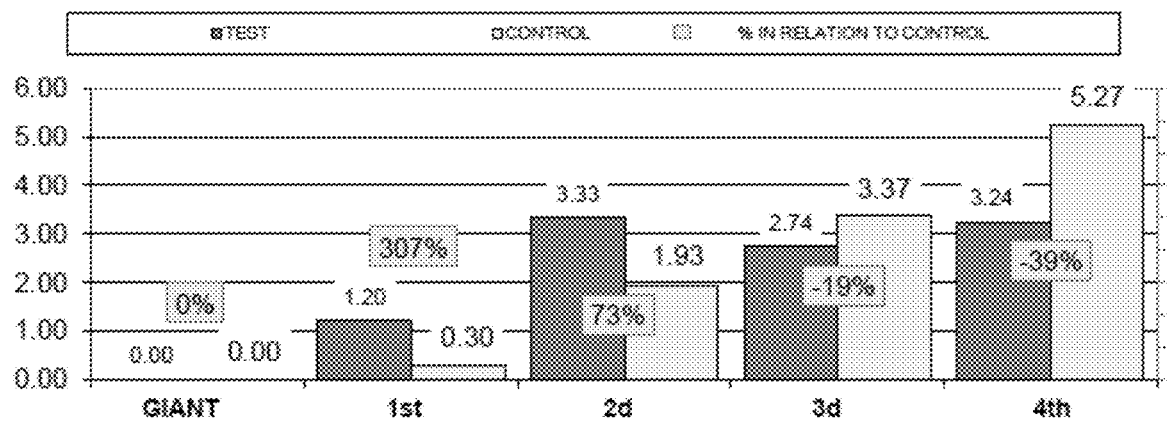
FIG. 4 is a graph which shows the number of pieces and mass distribution of potatoes treated with HYTa as compared to control.
Figure 5:
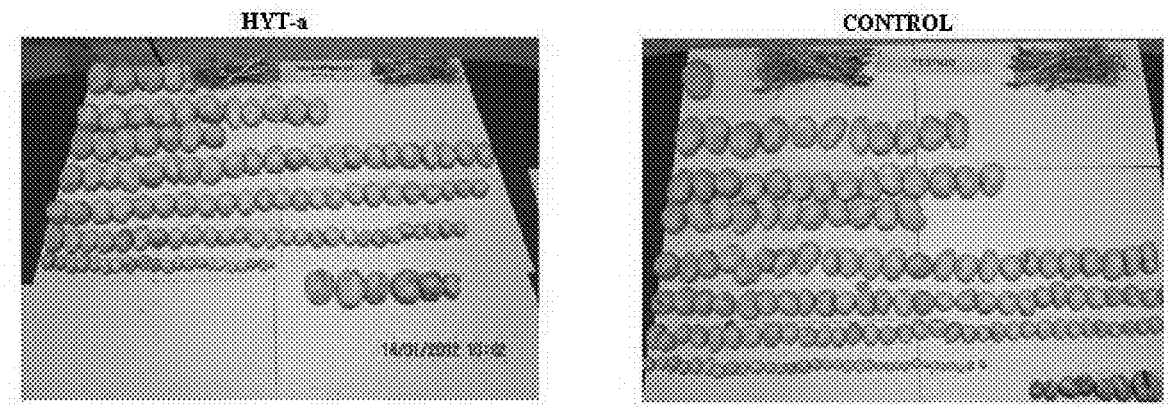
FIG. 5 contains photographs comparing the potatoes obtained after treatment with HYTa as compared to control.

The most valuable potatoes are giant potatoes followed by the 1st, 2nd and 3rd sizes. The next two sizes can be used for processed potatoes or seed. FIGS. 3 and 4 graphically present the results from Table 7. As can be seen there is a significant increase in the number and mass of potatoes in the 1st and second sizes. FIG. 5 contains photographs comparing the potatoes obtained.

Example 3

This example demonstrates the benefit of treating potatoes with HYTa, HYTb, HYTc and HYTd as compared to treatment with HYTa.

The soil contained 1% or less of organic matter and had a pH between 7.3 and 7.5 The following was applied per hectare over the course of the trial:

400 to 600 kg of ammonium sulfate.
250 to 400 kg of 11-52-0, phosphorus.
300 kg of potassium sulfate
150 to 200 kg of potassium nitrate
50 to 100 kg of magnesium sulfate
25 to 50 kg of zinc sulfate
HYTa—10 L
HYTb—8 L
HYTc—4 kg
HYTd—5 L Two liters of HYTa was applied to each hectare of soil with the first application of water. At planting, 4 liters of HYTa, 3 kilograms of HYTc and 5 liters of HYTd per hectare was applied to the soil. After stolon development 2 liters of HYTa per hectare was applied to the soil. When the potatoes were about 4 cm in size, 2 liters of HYTa per hectare was applied to the soil.

After the beginning of tuber formation, 1 liter of HYTb was applied to the plant leaves every 6 to 10 days. This was repeated eight times.

The results are presented in Table 8.

TABLE 8

| Size | TEST HYT + A + B + C + D Pieces | Kilos | CONTROL Pieces | Kilos | DIFFERENCE Pieces | Kilos | % IN RELATION TO CONTROL Pieces | Kilos |
|---|---|---|---|---|---|---|---|---|
| GIANT | 4 | 1.54 | 0 | 0.00 | 4 | 1.54 | | |
| $1^{st}$ | 8 | 2.07 | 1 | 0.30 | 7 | 1.76 | 700% | 602% |
| 2d | 19 | 3.60 | 11 | 1.93 | 8 | 1.68 | 73% | 87% |
| 3d | 32 | 4.04 | 25 | 3.37 | 7 | 0.68 | 28% | 20% |
| 4ta | 39 | 1.69 | 118 | 5.27 | −79 | −3.58 | −67% | −68% |
| MONO | 1 | 1.54 | 7 | 1.30 | −6 | 0.24 | −86% | 19% |
| TOTAL | 103 | 14.5 | 162 | 12.1 | −59 | 2.32 | −36% | 19% |

Figure 6:
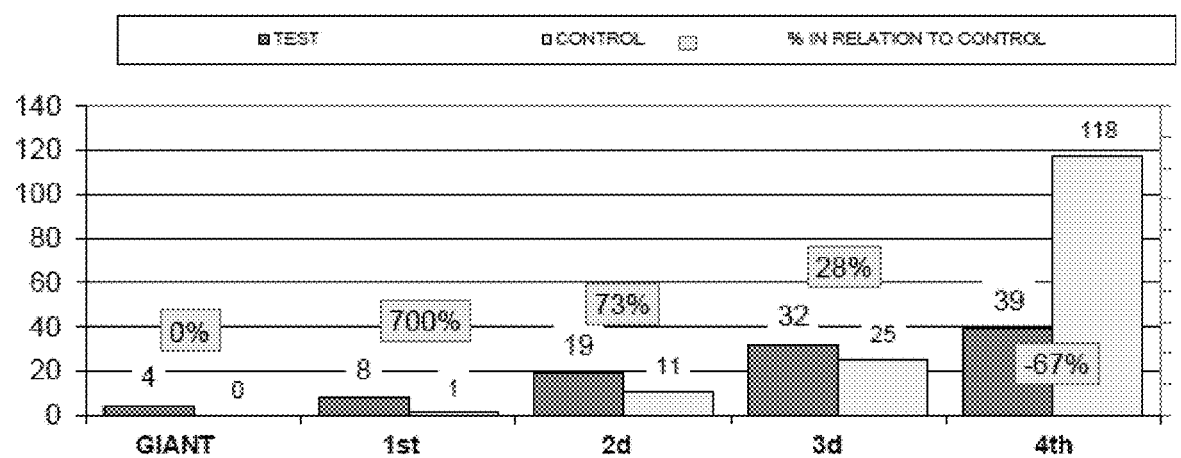
FIG. 6 is a graph which shows the number of pieces and size distribution of potatoes treated with HYTa as compared to control.
Figure 7:
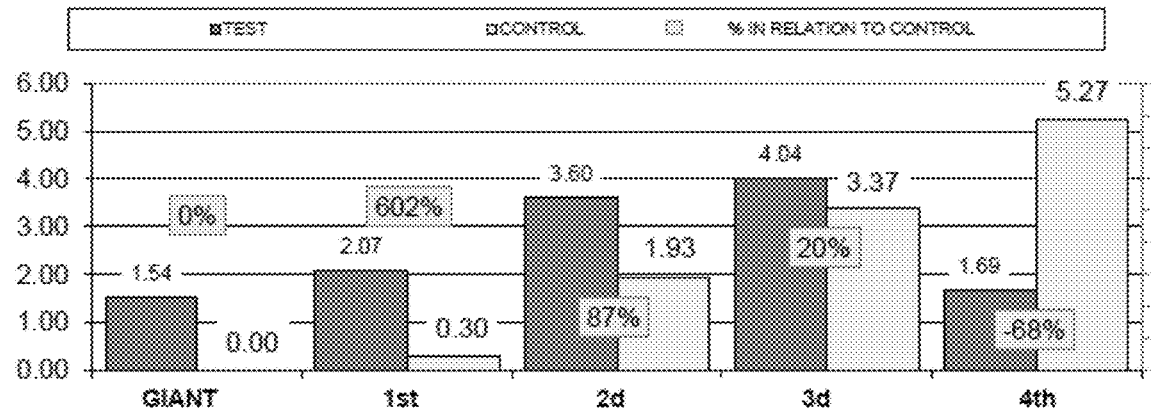
FIG. 7 is a graph which shows the number of pieces and mass distribution of potatoes treated with HYTa, HYTc, HYTc and HYTd as compared to HYTa.
Figure 8:
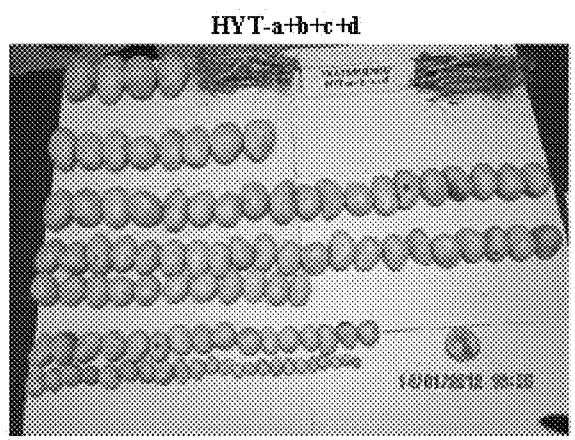
FIG. 8 contains photographs comparing the potatoes obtained after treatment with HYTa, HYTc, HYTc and HYTd as compared to HYTa.
Figure 8:
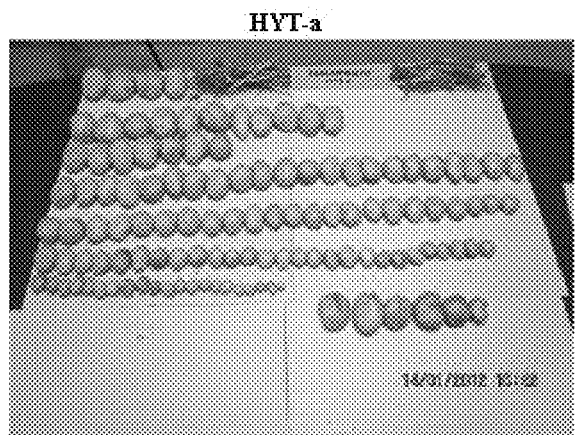

FIGS. 6 and 7 graphically present the results from Table 8. As can be seen there is a significant increase in the number and mass of potatoes in the giant through third sizes as compared to treatment with just HYTa. FIG. 8 contains photographs comparing the potatoes obtained.

Example 4

This example demonstrates the benefit of treating potatoes with HYTa, HYTb, HYTc and HYTd as compared to treatment with Metam-Sodium in a soil infested with fungi. The results are presented in Table 9.

The soil was treated as described in Example 3. HYTa, HYTc and HYTd were applied as set forth in Example 2. Three hundred liters of Metam Sodium was applied per hectare.

TABLE 9

| Size | TEST HYT + A + B + C + D Pieces | Kilos | CONTROL Metam-Sodium Pieces | Kilos | DIFFERENCE Pieces | Kilos | % IN RELATION TO CONTROL Pieces | Kilos |
|---|---|---|---|---|---|---|---|---|
| GIANT | 4 | 1.54 | 1 | 0.43 | 3 | 1.11 | 300% | 257% |
| $1^{st}$ | 8 | 2.07 | 1 | 0.32 | 7 | 1.75 | 700% | 547% |
| 2d | 19 | 3.60 | 35 | 6.46 | −16 | −2.86 | −46% | −44% |
| 3d | 32 | 4.04 | 24 | 2.67 | 8 | 1.38 | 33% | 52% |
| 4ta | 39 | 1.69 | 88 | 3.63 | −49 | −1.94 | −56% | −54% |
| MONO | 1 | 1.54 | 6 | 1.47 | −5 | 0.06 | −83% | 4% |
| TOTAL | 103 | 14.5 | 155 | 15.0 | −52 | −0.50 | −34% | −3% |

Figure 9:
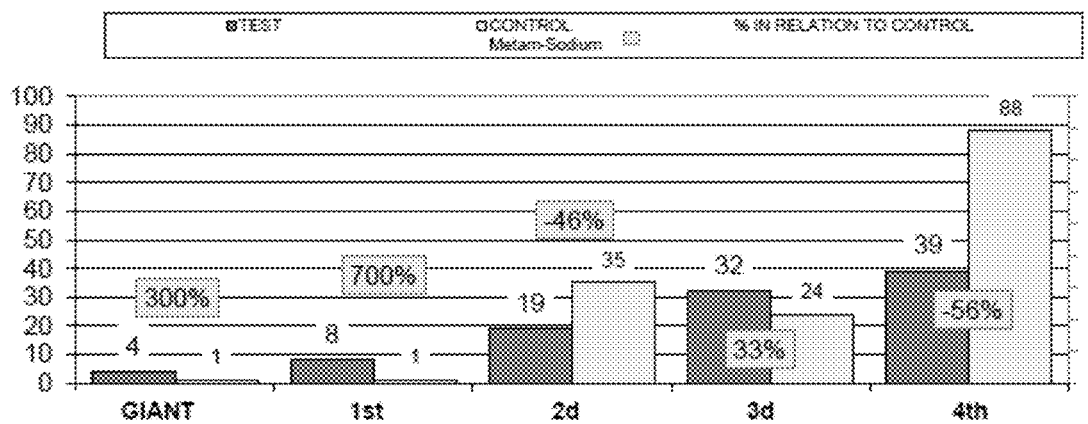
FIG. 9 is a graph which shows the number of pieces and size distribution of potatoes treated with HYTa, HYTc, HYTc and HYTd as compared to Metam-Sodium.
Figure 10:
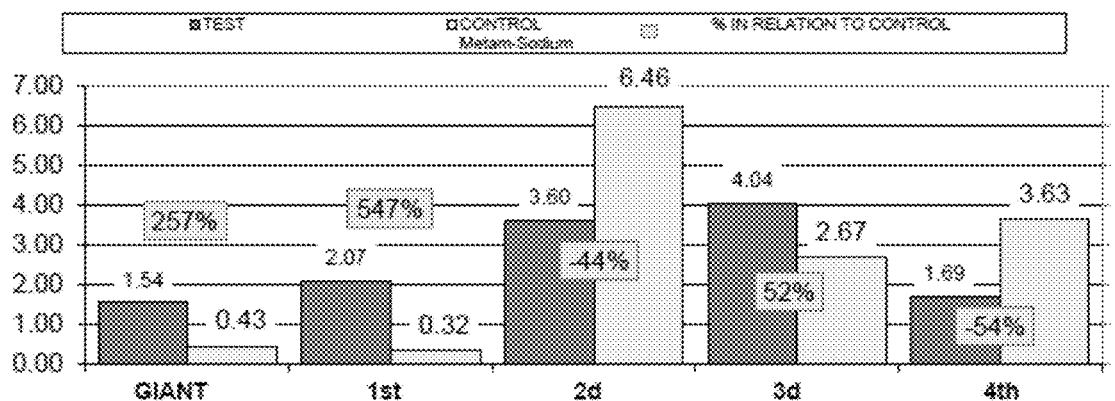
FIG. 10 is a graph which shows the number of pieces and mass distribution of potatoes treated with HYTa, HYTc, HYTc and HYTd as compared to Metam-Sodium.
Figure 11:
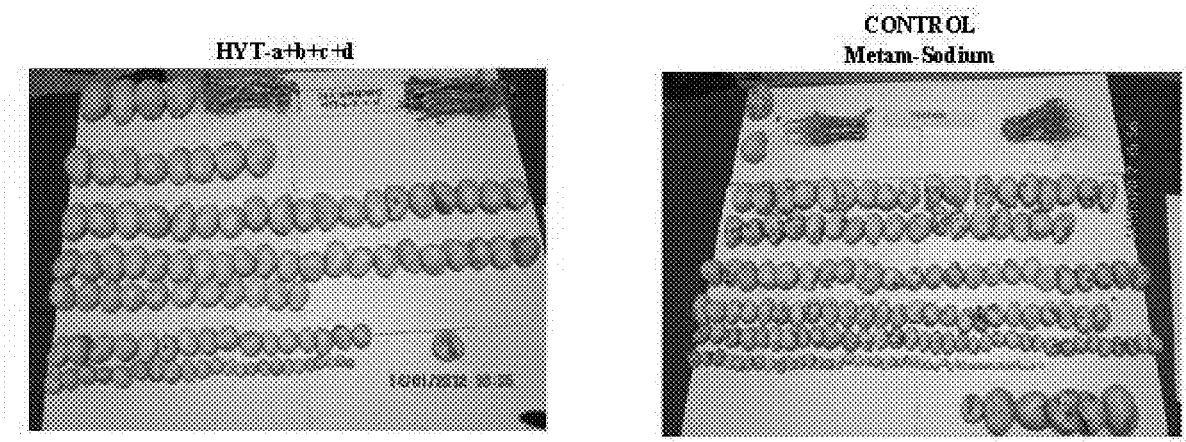
FIG. 11 contains photographs comparing the potatoes obtained after treatment with HYTa, HYTc, HYTc and HYTd as compared to Metam-Sodium.

FIGS. 9 and 10 graphically present the results from Table 9. As can be seen there is a significant increase in the number and mass of potatoes in the giant, first and third sizes as compared to treatment with Metam-Sodium. FIG. 11 contains photographs comparing the potatoes obtained.

Metam sodium is a soil fumigant used as a pesticide, herbicide, and fungicide. Its use is illegal it some countries due to environmental concerns. Treatment with HYTa, HYTb, HYTc and HYTd can eliminate the use of Metam sodium in certain applications thereby reducing its environmental impact and the cost of using this soil fumigant.

Example 5

This example demonstrates the effect HYTa and HYTc treatment of cucumber infested with the nematode Rhabditis and the fungus *Fusarium oxysporum*.

Ten liters of HYTa and 3 kilograms of HYTc per hectare was applied to the soil. This protocol was repeated 8 days later.

The results are shown in Table 10.

TABLE 10

| | Before Population of Nematodes per Kg. of Soil | | | After 18 days Population of Nematodes per Kg. of Soil | | |
|---|---|---|---|---|---|---|
| Nematode | Low <100 | Medium >100 < 500 | High >500 | Low <100 | Medium >100 < 500 | High >500 |
| *Rhabditis* | | | 9,600 | | | 850 |
| Fungus | Low <>400 | Medium >600 | High >700 | Low <>400 | Medium >600 | High >700 |
| *Fusarium oxysporum* | | | 770 | 3 | | |

As can be seen, the population of these organisms was substantially reduced 18 days after treatment.

Example 6

This example demonstrates the effect of HYTa, HYTc and HYTd treatment of tomato infested with the fungus *Fusarium oxysporum*.

Five liters of HYTa, 1 kilogram of HYTc and 5 liters of HYTd per hectare was applied to the soil. This treatment was repeated every 15 days The results are shown in Table 11

TABLE 11

| Unit Forming Colonies (UFC/gr) | HYTA, C + D | Control |
|---|---|---|
| *Fusarium oxysporum* | 500 | 1,666 |
| *Rhizoctonia solani* | 0 | |
| *Phytophthora* sp. | 0 | |
| *Pythium* sp | 0 | |

As can be seen treatment with HYTa, HYTc and HYTd significantly reduced the Unit Forming Colonies of the fungus.

Example 6

Tomato plant foliage infested with mildew (the fungus *Phytophthora infestans*) was treated with HYTd. Two, 4, 6 and 8 liters of HYTd was diluted in 100 liters of water for each hectare. The control was untreated tomatoes. After a week, the infestation was stopped. The fungus on the control crop meanwhile developed a cotton-like appearance which resulted in damage to the plant and the development of necrosis (results not shown). The optimal amount of HYTd for treating *Phytophthora infestans* is 6 liters per hectare.

The invention claimed is:

1. A process comprising contacting soil, seed, seedling or plant foliage with HYTd, wherein said HYTd comprises the liquid fraction obtained from the fermentation of HYTb and HYTc with the microbes in HQE (ATCC Patent Deposit designation PTA-10861), wherein said HYTb comprises the liquid fraction obtained from the fermentation of chitin-containing Arthropods with HQE and said HYTc comprises the solid fraction obtained from the fermentation of chitin-containing Arthropods with HQE.

2. The process of claim 1 further comprising contacting soil, seed, seedling or plant foliage with at least one of HYTa, HYTb and HYTc, wherein HYTa comprises the microbes in ATCC Patent Deposit designation PTA-10973.

3. The process of claim 2 where one or more of HYTa, HYTb, HYTc and HYTd are used at different times.

4. The process of claim 1 further comprising contacting soil, seed, seedling or plant foliage with two or more of HYTa, HYTb and HYTc, wherein HYTa comprises the microbes in ATCC Patent Deposit designation PTA-10973.

5. The process of claim 1 further comprising contacting soil, seed, seedling or plant foliage with HYTa, HYTb and HYTc, wherein HYTa comprises the microbes in ATCC Patent Deposit designation PTA-10973.

* * * * *